United States Patent
Tang et al.

(10) Patent No.: US 8,165,206 B2
(45) Date of Patent: Apr. 24, 2012

(54) METHOD AND APPARATUS FOR ENTERING/LEAVING FILM MODE WHEN PROCESSING VIDEO DATA

(75) Inventors: Sen-Huang Tang, Hsinchu (TW); Wen-Tsai Liao, Taipei Hsien (TW); Ming-Jane Hsieh, Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 1327 days.

(21) Appl. No.: 11/773,442

(22) Filed: Jul. 5, 2007

(65) Prior Publication Data

US 2008/0008236 A1 Jan. 10, 2008

(30) Foreign Application Priority Data

Jul. 6, 2006 (TW) ................................ 95124597 A

(51) Int. Cl.
- H04N 7/12 (2006.01)
- H04N 11/02 (2006.01)
- H04N 11/04 (2006.01)
- H04N 7/01 (2006.01)
- H04N 11/20 (2006.01)

(52) U.S. Cl. .................... 375/240.12; 348/448; 348/452; 348/458

(58) Field of Classification Search ............. 375/240.12; 348/448, 452, 458
See application file for complete search history.

(56) References Cited

U.S. PATENT DOCUMENTS

| | | | | |
|---|---|---|---|---|
| 5,365,273 | A * | 11/1994 | Correa et al. | 348/452 |
| 5,565,998 | A | 10/1996 | Coombs | |
| 6,870,568 | B1 * | 3/2005 | Hui | 348/458 |
| 7,039,111 | B2 * | 5/2006 | Lee | 375/240.16 |
| 7,050,088 | B2 | 5/2006 | Lin | |
| 7,446,818 | B2 * | 11/2008 | Chao | 348/558 |
| 7,623,576 | B1 * | 11/2009 | Hui et al. | 375/240.26 |
| 2002/0075412 | A1 * | 6/2002 | Tang et al. | 348/607 |
| 2004/0189877 | A1 * | 9/2004 | Choi et al. | 348/700 |
| 2005/0018767 | A1 * | 1/2005 | Lee | 375/240.1 |
| 2005/0157789 | A1 | 7/2005 | Chao | |
| 2005/0206790 | A1 * | 9/2005 | Chao | 348/700 |
| 2005/0212960 | A1 * | 9/2005 | Chao | 348/448 |
| 2005/0243215 | A1 * | 11/2005 | Doswald et al. | 348/701 |
| 2005/0249282 | A1 * | 11/2005 | Landsiedel et al. | 375/240.12 |
| 2007/0165957 | A1 * | 7/2007 | De Haan et al. | 382/236 |
| 2007/0296855 | A1 * | 12/2007 | Jia et al. | 348/441 |
| 2008/0062307 | A1 * | 3/2008 | Zhai et al. | 348/448 |
| 2008/0062308 | A1 * | 3/2008 | Zhai et al. | 348/448 |

* cited by examiner

*Primary Examiner* — Christian Laforgia
(74) *Attorney, Agent, or Firm* — Winston Hsu; Scott Margo

(57) ABSTRACT

A method for controlling a video data to enter a film mode for processing is disclosed, the video data including a plurality of target fields, the method including: determining whether a target field of the target fields is capable of being merged with a first neighboring field of the target field; if the target field can be merged with the first neighboring field, adding one to a merging number; and repeating the above steps until the merging number is determined to be not less than N, and then entering the film mode to process the video data; wherein N is a positive integer not less than two.

19 Claims, 4 Drawing Sheets

METHOD AND APPARATUS FOR ENTERING/LEAVING FILM MODE WHEN PROCESSING VIDEO DATA

BACKGROUND OF THE INVENTION

1. Field of the Invention

The invention relates to a method for entering and leaving a film mode, and more particularly, to a method for determining whether to enter or leave the film mode by examining whether a target field is capable of being merged with a neighboring field of the target field, and an apparatus thereof.

2. Description of the Prior Art

In progressive scanning, data of each image is complete, that is to say, data of even rows and odd rows will be played in the same image. Therefore, when using progressive scanning (or double frequency television image techniques) to play an image made up of odd fields or even fields only, the image should be recovered to full frame data so that the image can be presented reasonably. This technique of frame data recovering is called de-interlacing. When de-interlacing an interlaced film data, the neighboring odd field and even field can be combined to form a frame, which will be played twice to meet the requirement of frequency updating.

If the relationship of each field can be detected correctly, the video data mode can be inferred, such as 2:2 pull down or 3:2 pull down. The prior-art techniques determine whether to leave or enter the film mode by determining whether all film data belongs to 2:2 pull down or 3:2 pull down mode. For example, in the compression of an MPEG file, the order of the repeated image will be changed, so that the film mode will change to 4:3, 4:2, 3:3, 3:2, or 2:2 pull down when an MPEG file is played.

If the prior art techniques are used to detect the image of an MPEG file, instability of the film displaying will be caused by continuously entering or leaving movie mode. Moreover, if the operation of leaving film mode is not performed well, a sawtooth will be created whenever the video data is played, so that the quality of the image will be decreased.

SUMMARY OF THE INVENTION

It is therefore one of the objectives of the claimed invention to provide a method and an apparatus for entering or leaving the film mode, which not only can detect the pure 2:2 pull down and 3:2 pull down modes, but can also detect 4:3, 4:2, 3:3, 3:2, and 2:2 pull down modes. As a result, the invention can avoid unnecessarily entering and leaving film mode during image processing, and image quality and stability will thereby be increased.

A method for controlling a video data to enter a film mode for processing is disclosed, the video data including a plurality of target fields, the method comprising: determining whether a target field of the target fields is capable of being merged with a first neighboring field of the target field; if the target field can be merged with the first neighboring field, adding one to a merging number; and repeating the above steps until the merging number is determined to be not less than N, then entering the film mode to process the video data; wherein N is a positive integer not less than two.

A method for controlling a video data to leave a film mode for processing is disclosed, the video data including a plurality of target fields, the method comprising: determining whether a target field of the target fields is capable of being merged with a first neighboring field of the target field; repeating the above step if the target field is capable of being merged with the first neighboring field; determining whether the target field is capable of being merged with a second neighboring field of the target field; repeating the above steps if the target field is capable of being merged with the second neighboring field; and leaving the film mode to process the video data if the target field is not capable of being merged with the second neighboring field.

An apparatus for controlling a video data to enter/leave a film mode for processing is disclosed, the video data including a plurality of target fields, the apparatus comprising: a first merging detector, for determining whether a target field of the target fields is capable of being merged with a first neighboring field of the target field to generate a first determining signal corresponding to the target field; and a deciding unit, coupled to the first merging detector, for determining whether to enter the film mode to process the video data according to the first determining signal; wherein a merging number will be increased by one when the first determining signal indicates the target field capable of being merged with the first neighboring field.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
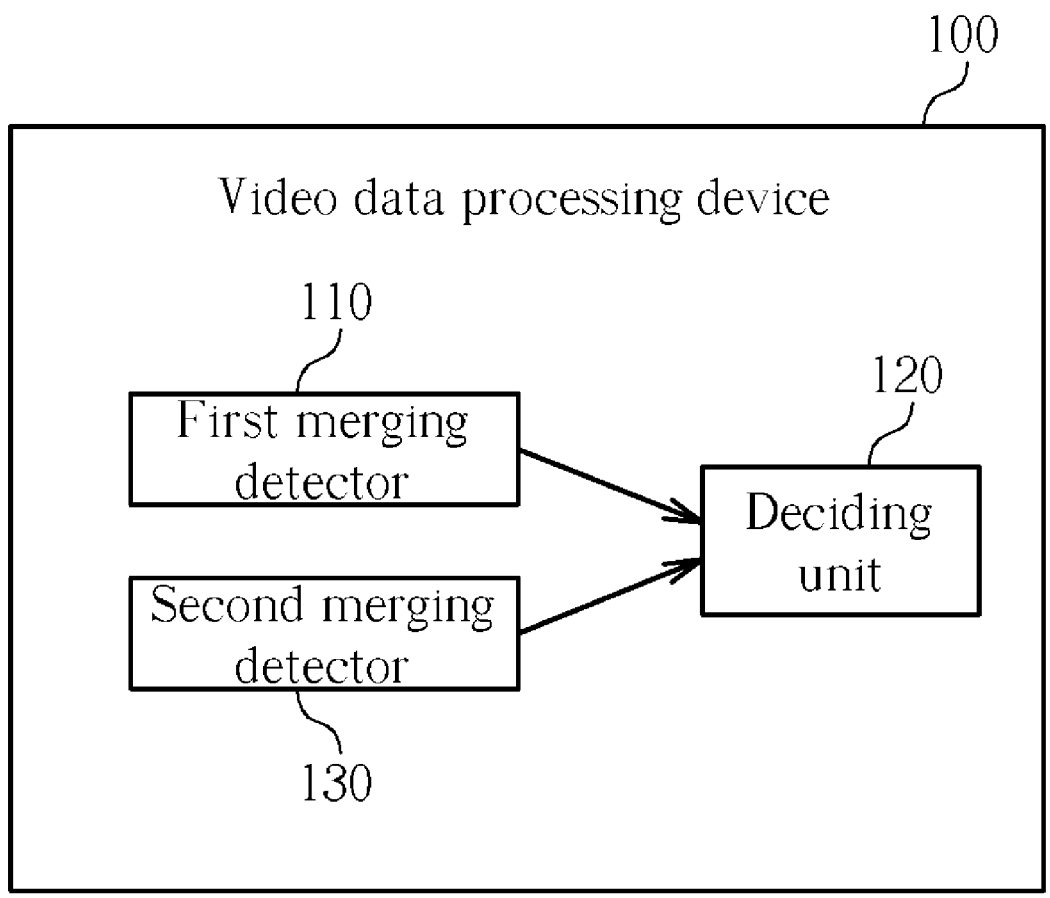
FIG. 1 is a block diagram of a video data processing device according to an embodiment of the present invention.

Please refer to FIG. 1. FIG. 1 is a block diagram of a video data processing device 100 illustrated according to an embodiment of the present invention. The video data processing device 100 is for determining the time to enter or to leave the film mode, wherein the video data includes a plurality of target fields. In this embodiment, the video data processing device 100 comprises a first merging detector 110, a second merging detector 130, and a deciding unit 120. The first merging detector 110 is used to examine whether a target field is capable of being merged with a first neighboring field to generate a first determining signal, wherein the first neighboring field can be located in front (or behind) of the target field. The second merging detector 130 is used to examine whether a target field is capable of being merged with a second neighboring field to generate a second determining signal, wherein the second neighboring field can be located in front (or behind) of the target field. The deciding unit 120, coupled to the first merging detector 110 and the second merging detector 130, is for determining whether to enter the film mode to process the video data according to at least one of the first and the second determining signals. In other words, the probability of entering the film mode to process the video data will be increased if the first determining signal indicates the target field is capable of being merged with the first neighboring field, or if the second determining signal indicates the target field is capable of being merged with the second neighboring field. This mechanism is installed in the accumulating unit (not illustrated) of the deciding unit 120, indicating that when the first and the second determining signal show that the target field is capable of being merged with the first or the second neighboring field, the accumulating unit 140 will add one to a merging number. When the merging number reaches a threshold, entering the film mode to process the video data is permitted.

Figure 2:
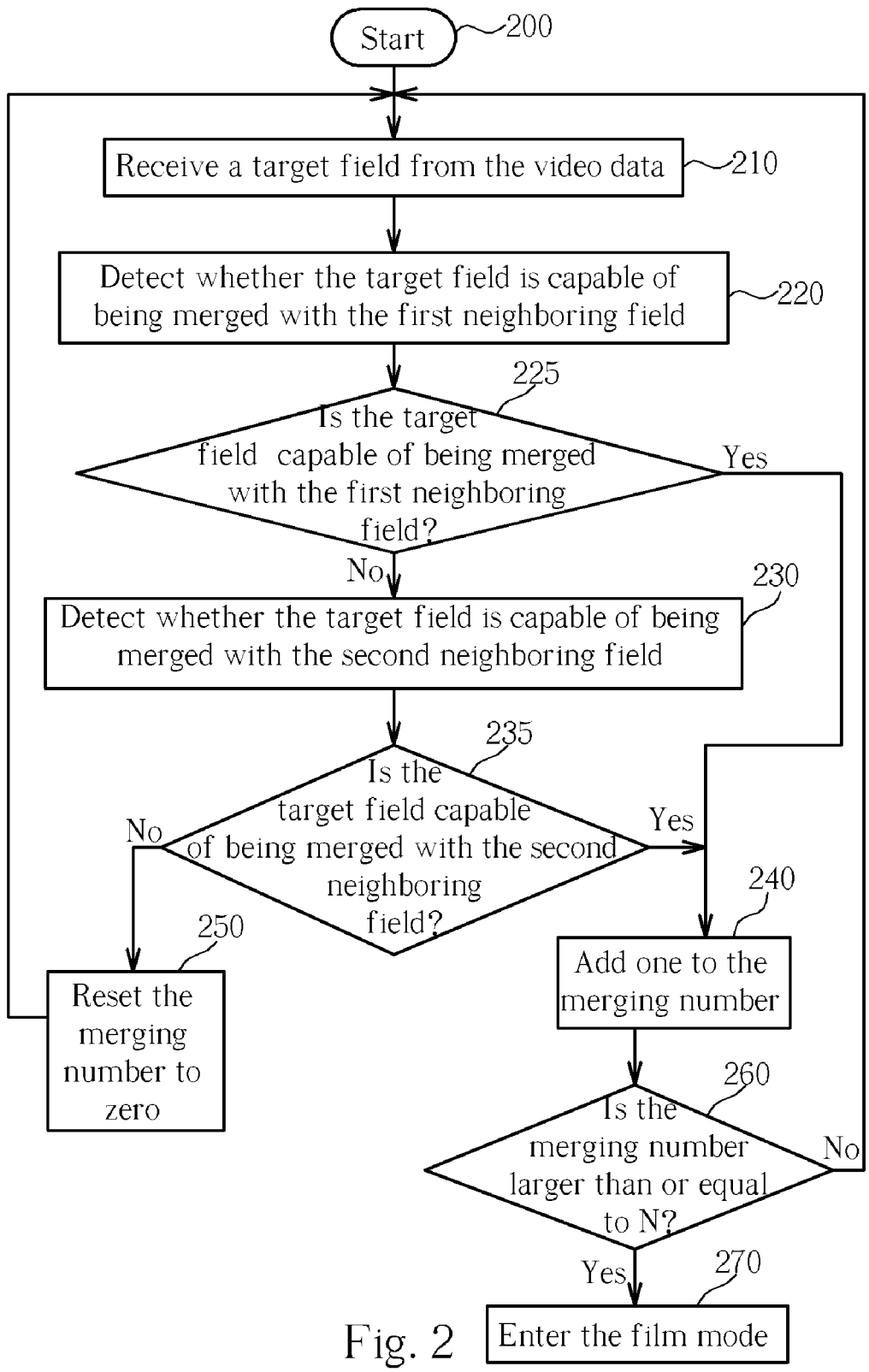
FIG. 2 is a flow chart of a method employed by the video data processing device for determining when to enter film mode.

Please refer to FIG. 2. FIG. 2 is a flow chart of a method employed by the video data processing device for determining when to enter the film mode. The operation of determining when to enter the film mode includes the following steps:

Step 200: Start.

Step 210: Receive a target field from the video data.

Step 220: Detect whether the target field is capable of being merged with the first neighboring field to generate a first determining signal corresponding to the target field.

Step 225: If the first determining signal indicates the target field is capable of being merged with the first neighboring field, go to step 240; otherwise, go to step 230.

Step 230: Detect whether the target field is capable of being merged with the second neighboring field to generate a second determining signal corresponding to the target field.

Step 235: If the second determining signal indicates the target field is capable of being merged with the second neighboring field, go to step 240; otherwise, go to step 250.

Step 240: Add one to the merging number.

Step 250: Reset the merging number to zero. Then go to step 210 to detect the next target field.

Step 260: Detect whether the merging number is larger than or equal to N. If yes, go to step 270; otherwise, go to step 210 to detect the next target field.

Step 270: Enter the film mode.

Please note that in order to maintain the best image quality and stability, entering the film mode frequently is avoided, such that the video data processing device 100 enters the film mode only when the merging number reaches N (where N is an integer larger than or equal to two).

The video data processing device 100 not only can determine when to enter the film mode but can also determine when to leave the film mode. If the film mode is entered, the first merging detector 110 examines whether a target field is capable of being merged with a first neighboring field to generate a first determining signal corresponding to the target field, and the second merging detector 130 examines whether a target field is capable of being merged with a second neighboring field to generate a second determining signal corresponding to the target field, wherein the target field is located between the first and the second neighboring field. In the end, the deciding unit 120 determines to leave the film mode when the first determining signal indicates the target field is not capable of being merged with the first neighboring field or when the second determining signal indicates the target field is not capable of being merged with the second neighboring field.

Figure 3:
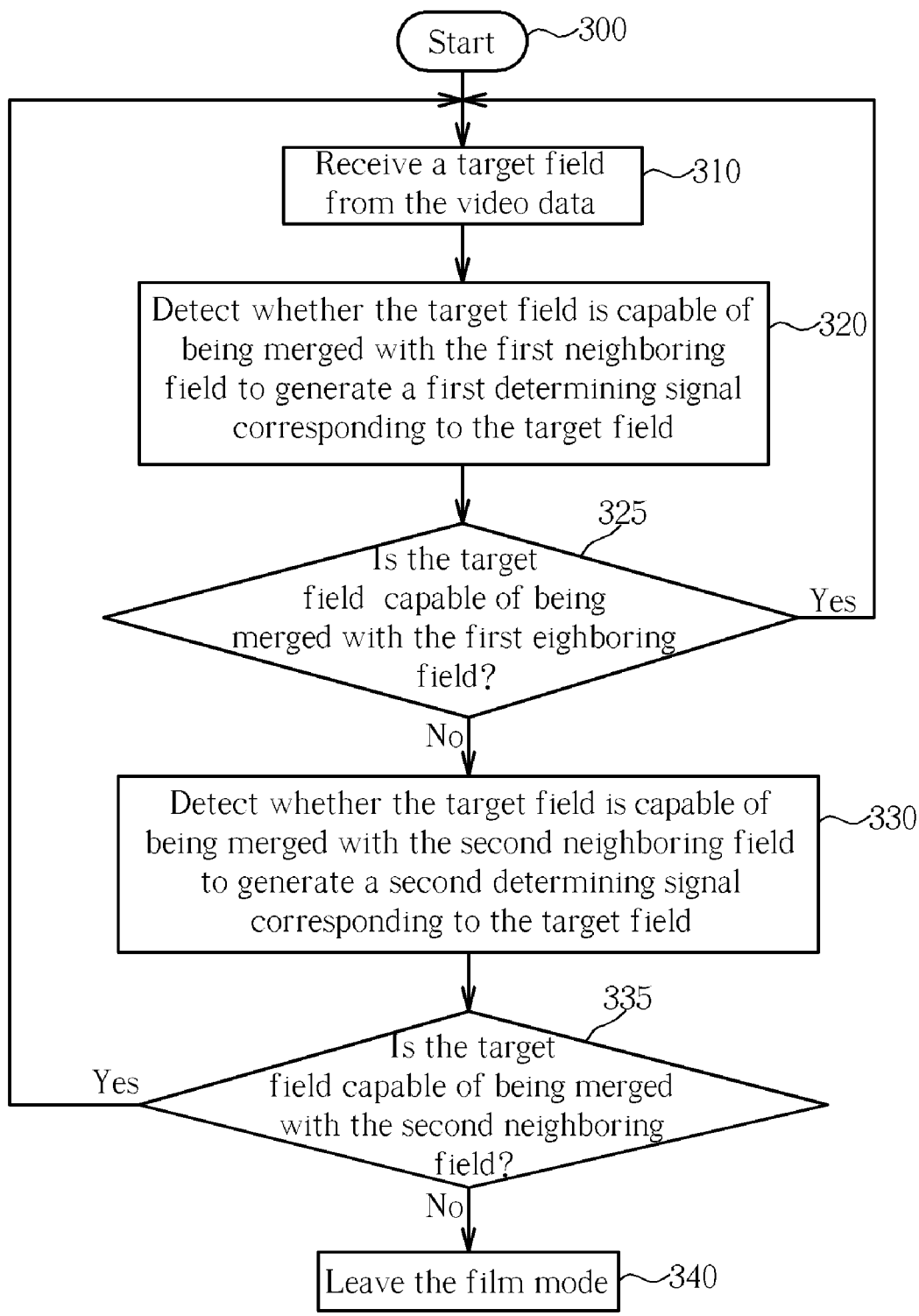
FIG. 3 is a flow chart of a method employed by the video data processing device for determining when to leave the film mode.

Please refer to FIG. 3. FIG. 3 is a flow chart of a method employed by the video data processing device 100 for determining when to leave the film mode. The operation of determining when to leave the film mode includes the following steps:

Step 300: Start.

Step 310: Receive a target field from the video data.

Step 320: Detect whether the target field is capable of being merged with the first neighboring field to generate a first determining signal corresponding to the target field.

Step 325: If the first determining signal indicates the target field is capable of being merged with the first neighboring field, go to step 310 to detect the next target field; otherwise, go to step 330.

Step 330: Detect whether the target field is capable of being merged with the second neighboring field to generate a second determining signal corresponding to the target field.

Step 335: If the second determining signal indicates the target field is capable of being merged with the second neighboring field, go to step 310 to detect the next target field; otherwise, go to step 340.

Step 340: Leave the film mode.

Figure 4:
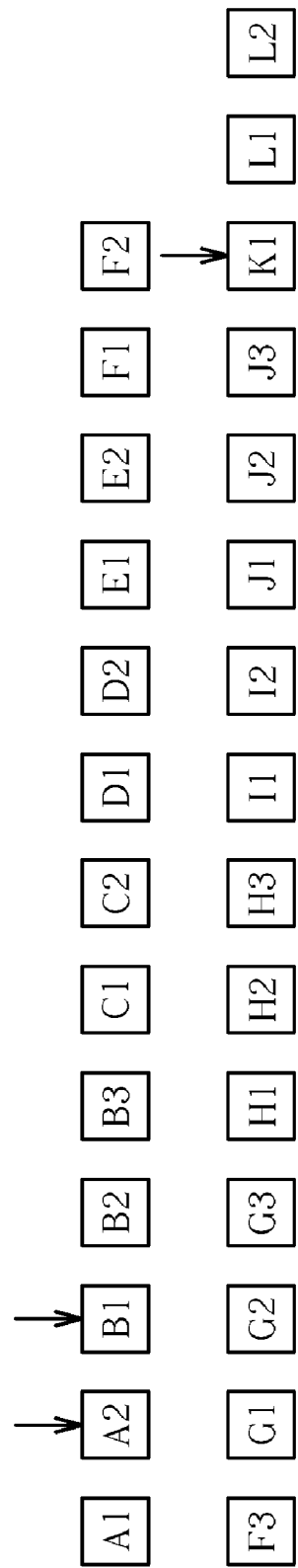
FIG. 4 is a diagram of an embodiment of the present invention.

For clarity, an example is given to illustrate the operation of determining when to leave or enter the film mode. Please refer to FIG. 4. FIG. 4 is a diagram of an embodiment of the present invention. As shown in FIG. 4, A1 is referred to as the first field of field A, and A2 is referred to as the second field of field A. The same system of naming is applied to field B, field C, field D, etc. When the target field is field A2, its first neighboring field is A1. The first merging detector 110 will examine whether A2 is capable of being merged with A1. Since A2 and A1 belong to the same type of field, A2 is capable of being merged with A1. The deciding unit 120 will therefore decide to enter the film mode. When the target field is B1, its first neighboring field is A2. The first merging detector 110 will examine whether B1 is capable of being merged with A2. Since B1 and A2 belong to different types of fields, B1 is not capable of being merged with A2. However, the second neighboring field of B1 is B2, so the second merging detector 130 will detect whether B1 is capable of being merged with B2. Since B1 and B2 belong to the same type of field, the deciding unit 120 will determine to enter the film mode. When the target field is referred to K1, its first neighboring field is J3. The first merging detector 110 will examine whether K1 is capable of being merged with J3. Since K1 and J3 belong to different types of fields, K1 is not capable of being merged with J3. The second neighboring field of K1 is L1. The second merging detector 130 will detect whether K1 is capable of being merged with L1. Since K1 and L1 also belong to different types of fields, the deciding unit 120 will determine not to enter the film mode. Please note that the present invention is not required to immediately enter the film mode when it is determined that entering the film mode is possible. To pursue the best image quality and stability, the present invention will first observe for a predetermined period of time before finally determining to enter the film mode.

FIG. 4 can also be used to illustrate clearly how the present invention determines to leave the film mode. In the process of leaving the film mode, if the target field is referred to A2, its first neighboring field is A1. The first merging detector 210 will detect whether A2 is capable of being merged with A1. Since A2 and A1 belong to the same field, they can be merged together. As a result, the deciding unit 230 will determine it is not the time to leave the film mode. If the target field is referred to B1, its first neighboring field is A2. The first merging detector 210 will detect whether B1 is capable of being merged with A2. Since B1 and A2 do not belong to the same field, they cannot be combined together. However, the second neighboring field of B1 is B2. The second merging detector 220 will detect whether B1 is capable of being merged with B2. Since B1 and B2 belong to the same field, they can be merged together. As a result, the deciding unit 230 will determine it is not the time to leave the film mode. When the target field is referred to K1, its first neighboring field is J3. The first merging detector 210 will exam whether K1 is capable of being merged with J3. Since K1 and J3 belong to different types of fields, K1 is not capable of being merged with J3. The second neighboring field of K1 is L1. The second merging detector 220 will detect whether K1 is capable of being merged with L1. Since K1 and L1 also belong to different types kind of fields, the deciding unit 230 will determine it is the time to leave the film mode and choose the leaving mode. In conclusion, the present invention determines to leave the film mode when it detects the 4:1, 3:1 or 2:1 pull down modes, indicating a single image is different from its prior and subsequent images.

When the target field is capable of being merged with its first neighboring field, it can be interlaced with its first neighboring field to generate a complete frame. In the same way, when the target field is capable of being merged with its second neighboring field, it can be interlaced with its second neighboring field to generate a complete frame, too. In other words, even if the 4:3, 4:2, 3:3, 3:2 or 2:2 pull down modes are detected, the present invention will not determine to leave the film mode but instead use two merging fields to generate a complete frame. Therefore, the present invention does not enter and leave the film mode frequently when the video data is played, as compared to the prior-art techniques.

Please note that the present invention can also apply prior-art techniques to detect 2:2 pull down and 3:2 pull down modes from the video data when determining the time to enter the film mode, and by incorporating the mechanism of determining when to leave the film mode, the situation of entering or leaving the film mode frequently can be avoided, so that image quality and stability will be improved remarkably.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a video data to enter a film mode for processing, the video data including a plurality of target fields, the method comprising:
   determining, by a first merging detector, whether a target field of the target fields is capable of being merged with a first neighboring field of the target field;
   each time the target field can be merged with the first neighboring field, adding one to a merging number; and
   repeating the above steps until the merging number is determined to be not less than N, and then entering the film mode to process the video data;
   wherein N is a positive integer not less than two.

2. The method of claim 1, wherein the first neighboring field is located in front of the target field.

3. The method of claim 1, wherein the first neighboring field is located behind the target field.

4. The method of claim 1, further comprising:
   examining, by a second merging detector, whether the target field is capable of being merged with a second neighboring field;
   adding one to the merging number if the target field is capable of being merged with the second neighboring field;
   resetting the merging number to zero if the target field is not capable of being merged with the second neighboring field; and
   repeating the above steps until the merging number is not less than N, and then entering the film mode to process the video data.

5. The method of claim 4, wherein the second neighboring field is located in front of the target field.

6. The method of claim 4, wherein the second neighboring field is located behind the target field.

7. A method for controlling a video data to leave a film mode for processing, the video data including a plurality of target fields, the method comprising:
   determining, by a first merging detector, whether a target field of the target fields is capable of being merged with a first neighboring field of the target field;
   repeating the above step if the target field is capable of being merged with the first neighboring field;
   determining, by a second merging detector, whether the target field is capable of being merged with a second neighboring field of the target field;
   repeating the above steps if the target field is capable of being merged with the second neighboring field; and
   remaining in the film mode to process the video data until the target field is not capable of being merged with the second neighboring field.

8. The method of claim 7, wherein the first neighboring field is located in front of the target field.

9. The method of claim 7, wherein the first neighboring field is located behind the target field.

10. The method of claim 7, wherein the second neighboring field is located in front of the target field.

11. The method of claim 7, wherein the second neighboring field is located behind the target field.

12. An apparatus for controlling a video data to enter or leave a film mode for processing, the video data including a plurality of target fields, the apparatus comprising:
    a first merging detector, for determining whether a target field of the target fields is capable of being merged with a first neighboring field of the target field to generate a first determining signal corresponding to the target field; and
    a deciding unit, coupled to the first merging detector, for determining whether to enter the film mode to process the video data according to the first determining signal;
    wherein a merging number will be increased by one each time the first determining signal indicates the target field is capable of being merged with the first neighboring field.

13. The apparatus of claim 12, wherein when the merging number reaches a threshold, the deciding unit determines that the video data should enter the film mode for processing.

14. The apparatus of claim 12, wherein the first neighboring field is located in front of the target field.

15. The apparatus of claim 12, wherein the first neighboring field is located behind the target field.

16. The apparatus of claim 12, further comprising:
    a second merging detector, for determining whether the target field is capable of being merged with a second neighboring field to generate a second determining signal corresponding to the target field, wherein the deciding unit is also coupled to the second merging detector for determining whether to enter the film mode to process the video data according to the second determining signal;
    wherein the merging number will be increased by one each time the second determining signal indicates the target field is capable of being merged with the second neighboring field, and when the first and the second determining signal both indicate the target field is not capable of being merged with the first neighboring field and the second neighboring field, the deciding unit determines that the video data should leave the film mode for processing.

17. The apparatus of claim 16, wherein when the merging number reaches a threshold, the deciding unit determines that the video data should enter the film mode for processing.

18. The apparatus of claim 16, wherein the second neighboring field is located in front of the target field.

19. The apparatus of claim 16, wherein the second neighboring field is located behind the target field.

* * * * *